United States Patent [19]

Davies et al.

[11] Patent Number: 5,070,985
[45] Date of Patent: Dec. 10, 1991

[54] COUPLING FOR A LINEAR DISPLACEMENT TRANSDUCER

[75] Inventors: Stephen H. Davies, Telford; Arthur L. Lloyd, Oxley, both of England

[73] Assignee: Lucas Industries, public limited company, Birmingham, England

[21] Appl. No.: 231,106

[22] Filed: Aug. 11, 1988

[30] Foreign Application Priority Data

Aug. 14, 1987 [GB] United Kingdom ............... 8719298

[51] Int. Cl.⁵ .............................................. F16H 25/12
[52] U.S. Cl. ................................ 192/141; 74/89.15; 74/424.8 R; 244/110 B
[58] Field of Search ...................... 74/89.15, 424.8 R; 192/141; 244/110 B

[56] References Cited

U.S. PATENT DOCUMENTS

| | | | |
|---|---|---|---|
| 2,660,281 | 11/1953 | Ochtman | 192/141 |
| 3,277,737 | 10/1966 | Goodman | 74/424.8 R |
| 3,319,481 | 5/1967 | Goodman | 192/141 X |
| 3,621,763 | 11/1971 | Geyer | 244/110 B X |
| 4,666,026 | 5/1987 | Poulin | 192/141 |

Primary Examiner—Allan D. Herrmann
Attorney, Agent, or Firm—Michael F. Petock

[57] ABSTRACT

A device for coupling a rotary member to an axially movable input stem of a linear displacement transducer comprises an axially movable element which is coupled to the stem and threadedly engages the rotary member. The axially movable element is restrained against rotation by spring loaded detents and has abutments which can engage a lug on the member when the element reaches its limiting axial positions. This engagement causes the element to be rotated with the member and input to the transducer is arrested.

7 Claims, 3 Drawing Sheets

COUPLING FOR A LINEAR DISPLACEMENT TRANSDUCER

This invention relates to a device for effecting mechanical coupling to a linear displacement transducer.

According to the invention there is provided a device for coupling a rotatable member to a linear variable displacement transducer which has a rotatable and linearly movable input stem, said device comprising a housing, an element axially movable in said housing and adapted for coupling to said input stem, said element having a threaded portion for engaging a complementary threaded portion on said member, spring-biased detent means for restraining said element against rotation, and abutments on said element and said member, said abutments being interengageable at one limiting extent of linear travel of said element relative to said member, to cause said element to overcome said detent means and to rotate with said member in a first direction only, whereby beyond said limiting extent of linear travel the input to the transducer remains unaltered.

An embodiment of the invention will now be described by way of example only and with reference to the accompanying drawings in which.

Figure 1:
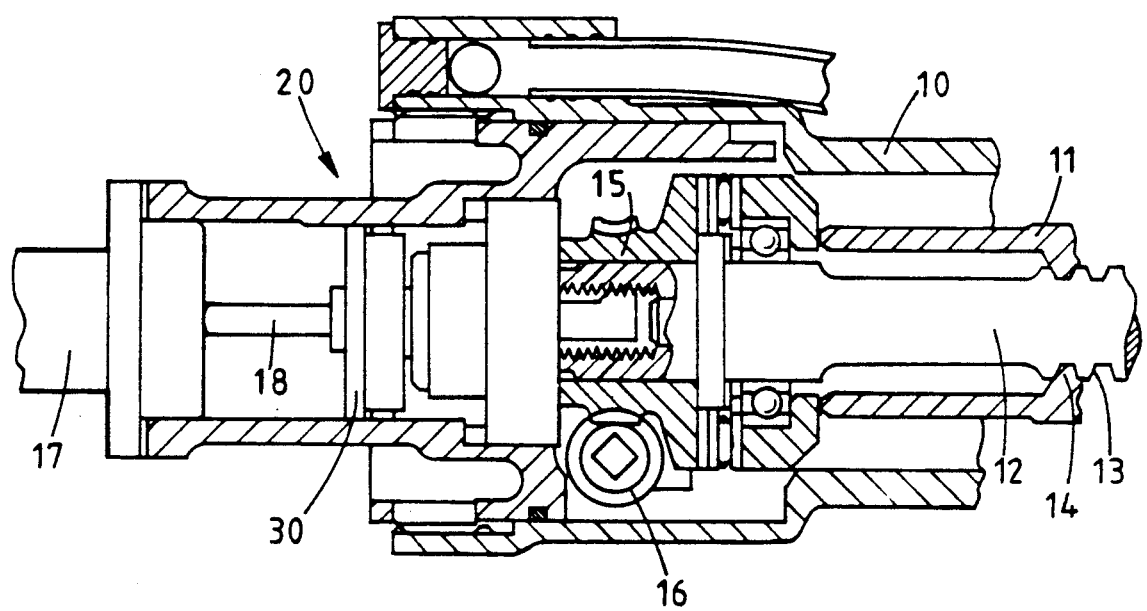
FIG. 1 is a section through one end of a linear actuator.

FIG. 1 shows one end of a linear actuator of the type shown and described in U.S. Pat. No. 3,621,763. The actuator has a housing 10 in which an output element 11 is axially movable by a fluid pressure. A rod 12 is journalled in the housing 10 and is restrained against axial movement relative thereto. The rod 12 extends within a bore of the output element 11 and has a high efficiency thread 13 which engages a complementary thread 14 in the element 11. A toothed wheel 15 is secured to the rod 12 for rotation therewith and engages a worm 16 from which a flexible transmission (not shown) extends to a corresponding worm in an identical actuator. The actuators are thereby constrained to operate in unison.

A linear variable displacement transducer 17 is mounted on the housing 10 and has an input stem 18 which is both linearly movable and rotatable, only the linear movement resulting in a change in output of the transducer 17. Coupling between the rod 12 and the transducer 17 is by way of a device 20, shown in more detail in FIGS. 2, 3 and 4.

Figure 2:
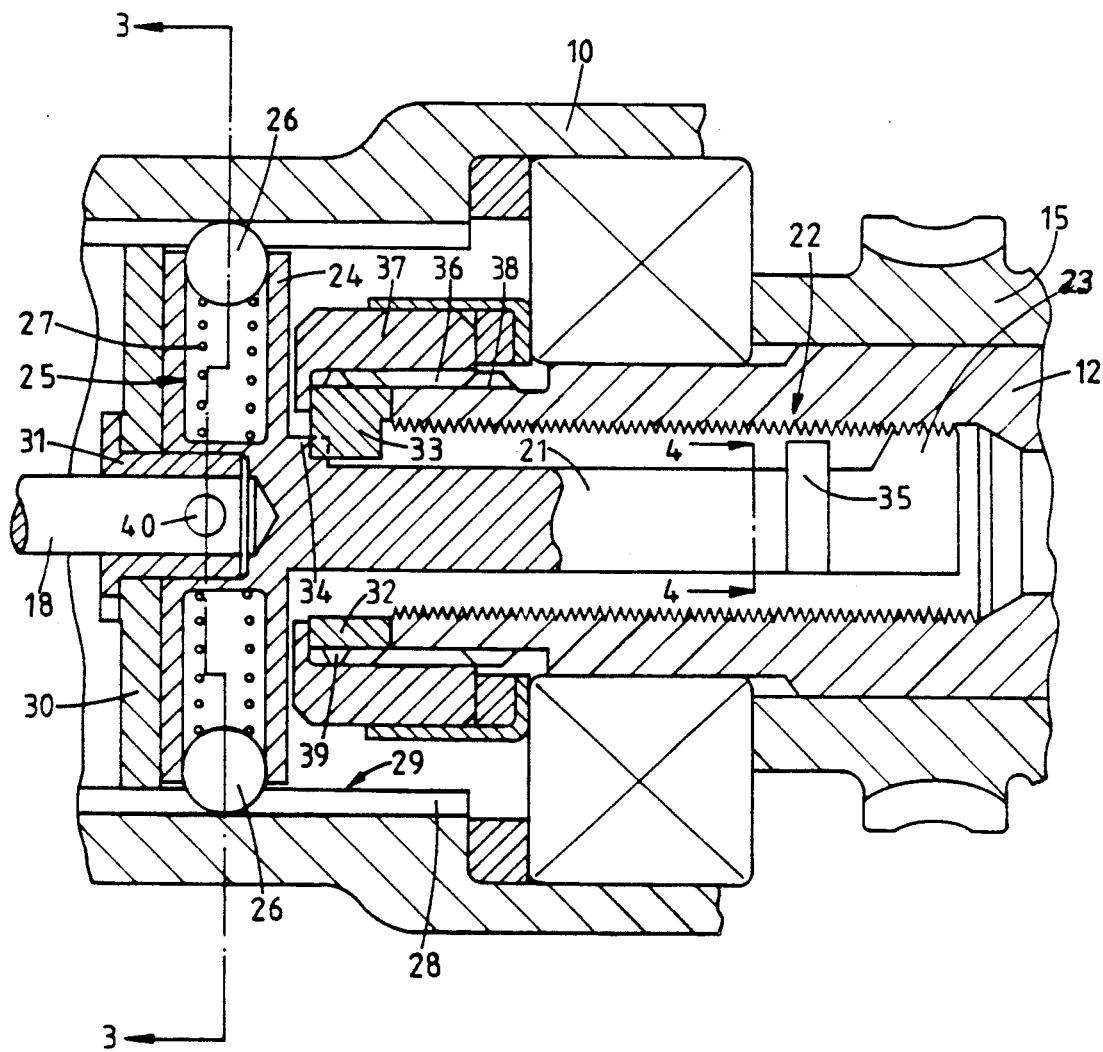
FIG. 2 is a section to an enlarged scale of part of FIG. 1.
Figure 3:
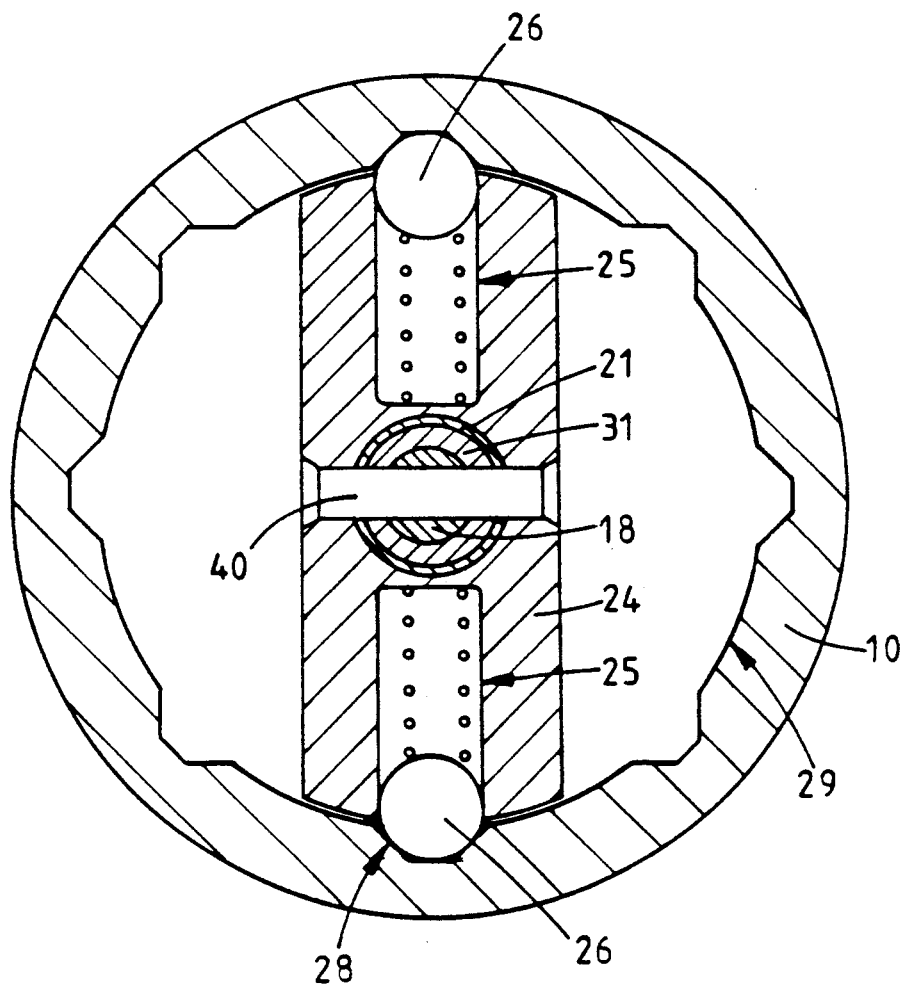
FIG. 3 is a section on line 3—3 in FIG. 2.

As shown in FIG. 2 the device 20 comprises an element 21 which is axially movable within a threaded bore 22 of the rod 12. The element 21 has an end portion 23 of enlarged radius which is threadedly engaged with the bore 22, the pitch of these threads being such that the bore 22 can accommodate linear movement of the element 21 over the whole range of linear movement of the output element 11 (FIG. 1). The element 21 has a cross-piece 24 having two diametrally opposed radial bores 25 in which balls 26 are slidable. The balls 26 are biased by light springs 27 into engagement with diametrally opposed grooves 28 in a cylindrical bore 29 in the housing 10. As shown in FIG. 3 there are four angularly equi-spaced pairs of the grooves 28 and these cooperate with the balls 26 to provide spring loaded detents which restrain the element 21 against rotation. The stem 18 of the transducer 17 is secured by a pin 40 to the element 21 and an antifriction phosphor bronze disc 30 is mounted on the element 21 by a bush 31. The disc 30 engages the cylindrical surface of the bore 29 to support and centre the element 21.

Figure 4:
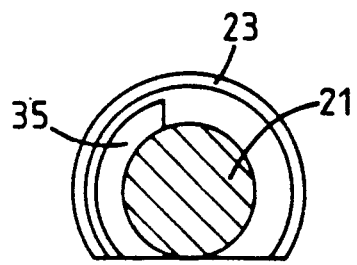
FIG. 4 is a section on line 4—4 in FIG. 2.

Splines 36 on sleeve 37 engage respective complementary splines 38, 39 on the rod 12 and on a collar 32, the collar 32 being thereby coupled to the rod 12 for rotation therewith, the collar 32 having a radially inwardly extending lug 33. The element 21 has two axially spaced abutments 34, 35 which can engage the lug 33. As shown in FIG. 4, the abutment 35 is such that its engagement with the lug 33 causes rotation of the element 21 with the rod 12 in one direction only away from a detent position, that is in an anticlockwise direction as viewed in FIG. 4. Reversal of the direction of rotation of the rod 12 allows the balls 26 to arrest rotation of the element 21, so that the latter once again moves linearly. The abutment 34 operates to cause rotation of the element 21 with the rod 12 when the latter is moving clockwise, as viewed on arrows 4—4 in FIG. 2.

In use, rightward movement of the output element 11 from the position shown in FIG. 1 acts through the threads 13, 14 to cause anticlockwise rotation of the rod 12, as viewed in the direction of arrows 4. Any tendency of the element 21 to follow rotation of the rod 12 is resisted by friction of the balls 26 against the housing 10. The lug 33 thus disengages from the abutment 34. The balls 26 can again restrain rotation of the element 21 which thereafter moves axially leftwards, operating the transducer 17. The other end of travel of the output element 11 coincides with engagement of the abutment 35 with the lug 33. The element 21 thereafter rotates with the rod 12 and axial movement of the element 21 and stem 18 is arrested. Leftward movement of the output element 11, as viewed in FIG. 1, acts through the threads 13, 14 to cause clockwise rotation of the rod 12, as viewed on arrows 4—4. Any tendency of the element 21 to follow rotation of the rod 12 is resisted by friction of the balls 26 against the housing 10, and the abutment 35 disengages from the lug 33. The balls 26 again restrain rotation of the element 21 and the element 21 and stem 18 are moved rightwards by the thread 22.

An actuator of the type described is typically employed to deploy and stow thrust reversers on a gas turbine engine, and connection between the output element 11 and its actuated part may be such as to permit relative rotation between the element 11 and the housing 10. It will be apparent that in the absence of a coupling device of the type described such relative rotation will result in a position error signalled by the transducer 17. Since, however, the lug 33 is fixed axially relative to the housing 10, axial movement of the stem 18 will cease as soon as a predetermined number of turns of the rod 12 has occurred, that is after a predetermined linear displacement of the output element 11 in either direction. The transducer 18 is thereby effectively reset at each operation of the actuator.

we claim:

1. A device for coupling a rotatable member to a linear variable displacement transducer which has a linearly movable input stem, comprising a housing, an element, axially movable in said housing and adapted for coupling to said input stem, said element having a threaded portion engaging a complementary threaded portion on said member, a spring-biassed detent means for restraining said element against rotation, and abutments on said element and said member, said abutments being interengageable at one limiting extent of linear travel of said element relative to said member, to cause said element to overcome said detent means and to rotate with said member in a first direction only, whereby beyond said one limiting extent of linear travel the input to said transducer remains unaltered.

2. A device as claimed in claim 1, in which said element and said member have abutments which are interengageable at an opposite limiting extent of linear travel of said element relative to said member to cause said element to overcome said detent means and to rotate with said member in a second direction only, whereby beyond said second limiting extent of linear travel the input to said transducer remains unaltered.

3. A device as claimed in claim 1 in which said detent means comprises a cylindrical bore having a plurality of longitudinally extending grooves therein, and a spring-loaded ball carried by said element and engageable in said grooves.

4. A device as calimed in claim 3 which includes an antifriction disc carried by said element and engaging the cylindrical surface of said bore.

5. A device as claimed in claim 1 in which said rotatable member threadedly engages an axially movable actuator output element for rotation thereby whereby the input to said transducer remains unaltered in response to movement of said output element beyond a limiting position.

6. A device as claimed in claim 2 in which said detent means comprises a cylindrical bore having a plurality of longitudinally extending grooves therein, and a spring-loaded ball carried by said element and engageable in said grooves.

7. A device as claimed in claim 2 which said rotatable member threadedly engages an axially movable actuator output element for rotation thereby whereby the input to said transducer remains unaltered in response to movement of said output element beyond a limiting position.

* * * * *